United States Patent
Murphy et al.

(10) Patent No.: US 12,093,387 B2
(45) Date of Patent: Sep. 17, 2024

(54) ENDPOINT DETECTION AND RESPONSE ATTACK PROCESS TREE AUTO-PLAY

(71) Applicant: International Business Machines Corporation, Armonk, NY (US)

(72) Inventors: Dara P. Murphy, Galway (IE); Michael J. Ryan, Claregalway (IE)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 17/303,415

(22) Filed: May 28, 2021

(65) Prior Publication Data

US 2021/0294896 A1    Sep. 23, 2021

Related U.S. Application Data (63) Continuation of application No. 16/205,475, filed on Nov. 30, 2018, now Pat. No. 11,055,408.

(51) Int. Cl.
| | | |
|---|---|---|
| *G06F 21/56* | (2013.01) | |
| *G06F 21/55* | (2013.01) | |
| *H04L 29/06* | (2006.01) | |

(52) U.S. Cl.
CPC .......... *G06F 21/566* (2013.01); *G06F 21/554* (2013.01); *G06F 2221/034* (2013.01)

(58) Field of Classification Search
CPC .............................. G06F 21/566; G06F 21/554
USPC .......................................................... 726/23
See application file for complete search history.

(56) References Cited

U.S. PATENT DOCUMENTS

| | | | |
|---|---|---|---|
| 9,009,827 B1 | 4/2015 | Albertson | |
| 10,063,434 B1 | 8/2018 | Khanal | |
| 10,263,998 B1 * | 4/2019 | Bhatt | H04L 63/1416 |
| 10,567,402 B1 * | 2/2020 | Comeaux | H04L 63/1433 |
| 10,805,340 B1 * | 10/2020 | Goradia | H04L 63/145 |
| 11,055,408 B2 * | 7/2021 | Murphy | G06F 21/566 |
| 2013/0326623 A1 | 12/2013 | Kruglick | |
| 2014/0223560 A1 | 8/2014 | Christodorescu | |

(Continued)

FOREIGN PATENT DOCUMENTS

| | | | | |
|---|---|---|---|---|
| CN | 107704599 A | | 2/2018 | |
| CN | 107196910 B | * | 9/2019 | ......... H04L 41/0246 |
| CN | 109286511 B | * | 10/2021 | ........... H04L 41/069 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Haresh N Patel
(74) *Attorney, Agent, or Firm* — Yee & Associates, P.C.

(57) ABSTRACT

A computer receives one or more security alerts. The computer selects a subset of the one or more security alerts for processing. The computer executes one or more queries automatically, based on the subset of the one or more security alerts. The computer identifies one or more related processes, wherein the one or more related processes are related to information contained within the subset of the one or more security alerts. The computer displays a full flow of a malware attack, wherein the full flow includes the information contained within the subset of the one or more security alerts and the one or more related processes.

20 Claims, 8 Drawing Sheets

(56) References Cited

U.S. PATENT DOCUMENTS

| | | |
|---|---|---|
| 2014/0289851 A1 | 9/2014 | Klein |
| 2015/0009038 A1* | 1/2015 | Trossbach, Jr. .......... G08B 5/22 |
| | | 340/691.6 |
| 2015/0268990 A1* | 9/2015 | Greene ............... G06F 11/3476 |
| | | 718/104 |
| 2015/0326600 A1 | 11/2015 | Karabatis |
| 2016/0301704 A1 | 10/2016 | Hassanzadeh |
| 2016/0301709 A1 | 10/2016 | Hassanzadeh |
| 2016/0359872 A1 | 12/2016 | Yadav |
| 2016/0359880 A1* | 12/2016 | Pang ................... G06F 16/1748 |
| 2016/0378980 A1 | 12/2016 | Ijiro |
| 2017/0116420 A1 | 4/2017 | Rubakha |
| 2017/0249462 A1 | 8/2017 | Permeh |
| 2017/0286683 A1 | 10/2017 | Barak |
| 2018/0131719 A1* | 5/2018 | Amit ................... H04L 63/1441 |
| 2018/0196942 A1 | 7/2018 | Kashyap |
| 2018/0248893 A1 | 8/2018 | Israel |
| 2019/0095455 A1 | 3/2019 | Barreto |
| 2019/0124109 A1* | 4/2019 | Foster ................... H04L 67/306 |
| 2019/0311115 A1 | 10/2019 | Lavi |
| 2020/0014724 A1* | 1/2020 | Venkatasubramanian ................... H04L 61/5007 |
| 2020/0082081 A1 | 3/2020 | Sarin |
| 2020/0151326 A1* | 5/2020 | Patrich ................. G06F 21/554 |

OTHER PUBLICATIONS

Mell et al., "The NIST Definition of Cloud Computing", National Institute of Standards and Technology, Special Publication 800-145, Sep. 2011, 7 pages.

List of IBM Patents or Patent Applications Treated as Related, signed May 28, 2021.

* cited by examiner

ENDPOINT DETECTION AND RESPONSE ATTACK PROCESS TREE AUTO-PLAY

BACKGROUND

Endpoint detection and response (EDR) involves detection and response to cyber security attacks on endpoint devices. Products exist which can detect an attack but include limitations that require that a security analyst perform significant analysis before the analyst can fully respond to the attack. In some cases, the security analyst may choose to destroy the infected device rather than trust that they have the information they need to repair the device following infection.

SUMMARY

Disclosed herein are embodiments of a method, system, and computer program product for automated endpoint detection and response. A computer receives one or more security alerts. The computer selects a subset of the one or more security alerts for processing. The computer executes one or more queries automatically, based on the subset of the one or more security alerts. The computer identifies one or more related processes, wherein the one or more related processes are related to information contained within the subset of the one or more security alerts. The computer displays a full flow of a malware attack, wherein the full flow includes the information contained within the subset of the one or more security alerts and the one or more related processes.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to endpoint detection and response (EDR), and more specifically, to EDR attack process tree auto-play. While the present disclosure is not necessarily limited to such applications, various aspects of the disclosure can be appreciated through a discussion of various examples using this context.

On many endpoints, there are massive numbers of processes running and events being generated, both at any given time and over a period of time. Given the state of malware today, including viruses, trojans, adware, worms, and other types of malware, it can be difficult for a security analyst or malware product to hone in on the key chain of events among masses of data.

Some forms of malware include where an attack process or file is named or otherwise made to appear to be a legitimate file. For example, malware may be named with the same name as an operating system file instead of "trojan_downloader.exe" in an effort to avoid detection. References in this disclosure to example process or file names should not be read as limiting to those examples, nor should the example names used (even if they match real processes or files, such as winzip32.exe, outlook.exe, etc.) be read to impute any negative characterization to legitimate versions of those files or processes, or a company or other source of such example files or processes.

In embodiments of the present disclosure, a computer is configured to automatically traverse a process tree, end-to-end, showing the key details associated with an attack. As used herein, a process tree is a visual representation of all recorded events and processes that occurred on a device, to identify what happened on a device over a particular time frame. As well as playing the attack flow, the computer can highlight important milestones from the source of the attack to the malicious action taken (such as external connections being initiated) to alerts generated. This provides for a simple visual flow, from which the security analyst can see the point of initial attack, through to any associated alerts that were generated, and the points at which any suspicious events or actions occurred. The computer can discover links between the events to correlate alerts and events. This can include utilizing investigation leads to execute queries to correlate events. Thus, by playing the attack flow and/or highlighting important milestones, the embodiments described herein enable improved detection of attacks as well as responses to such attacks.

Embodiments of the present disclosure provide for automatic capabilities to display the attack flow from the point of initial attack through to a security breach. This reduces the amount of time a security analyst spends on initial investigation and simplifies the investigation so that less expertise is required to correlate events and trace the attack flow. It also provides an initial response for the security analyst, such as automatic quarantine of the compromised endpoint or a suggested course of action for addressing the attack, therefore lessening the damage and associated costs. This can also result in a faster response which can prevent other devices from being compromised, data lost, or other negative effects of a malware attack. Additional benefits include that less skilled people can use the automated EDR attack process tree analysis in identifying security attacks, accuracy and detection rates can be improved, alerts which do not actually correspond to malware (false positives) can be detected and eliminated, and security analysts' time can be saved.

These improvements and/or advantages are a non-exhaustive list of example advantages. Embodiments of the present disclosure exist which can contain none, some, or all of the aforementioned advantages and/or improvements.

Figure 1:
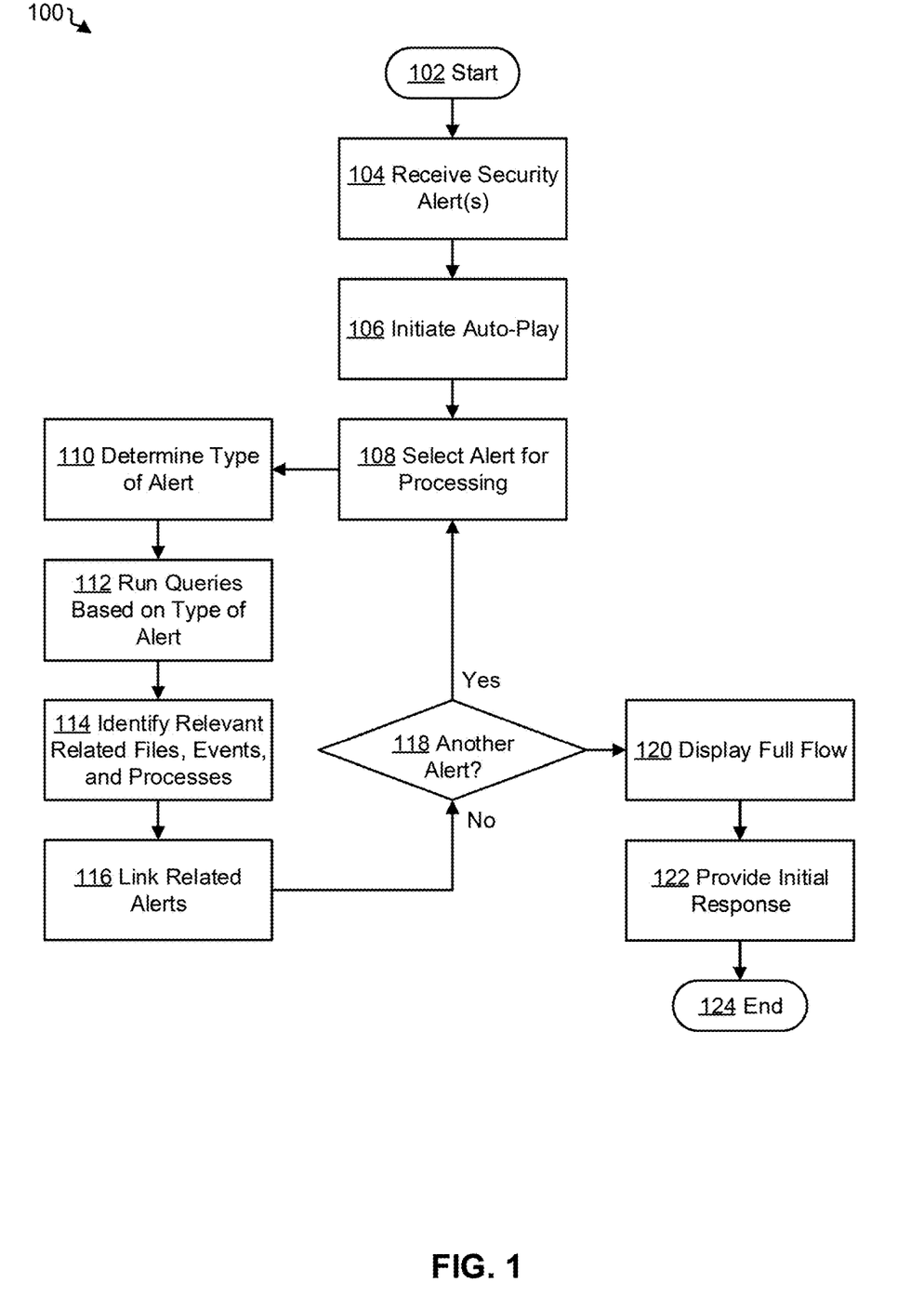
FIG. 1 depicts an example method for automated endpoint detection and response attack process tree analysis, in accordance with embodiments of the present disclosure.
Figure 7:
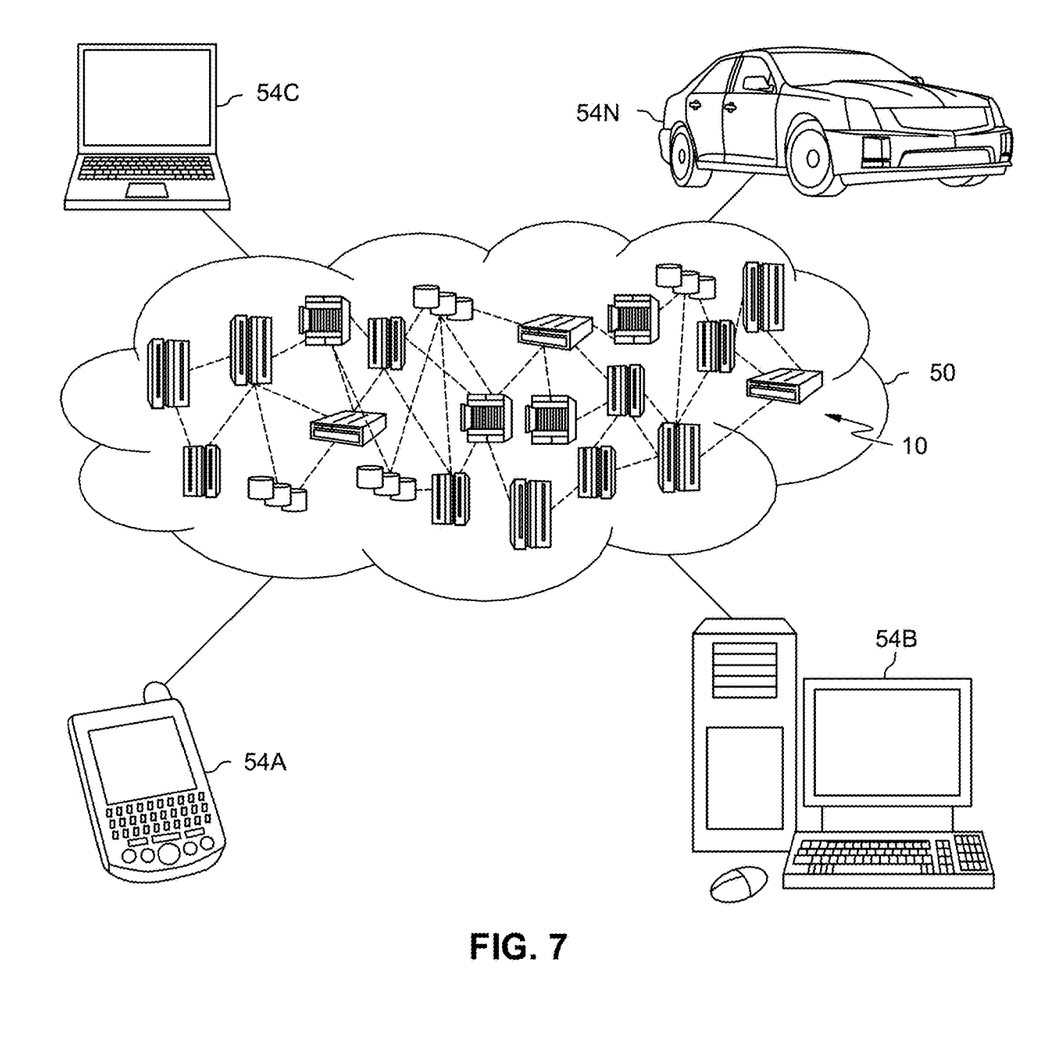
FIG. 7 depicts a cloud computing environment according to an embodiment of the present disclosure.
Figure 8:
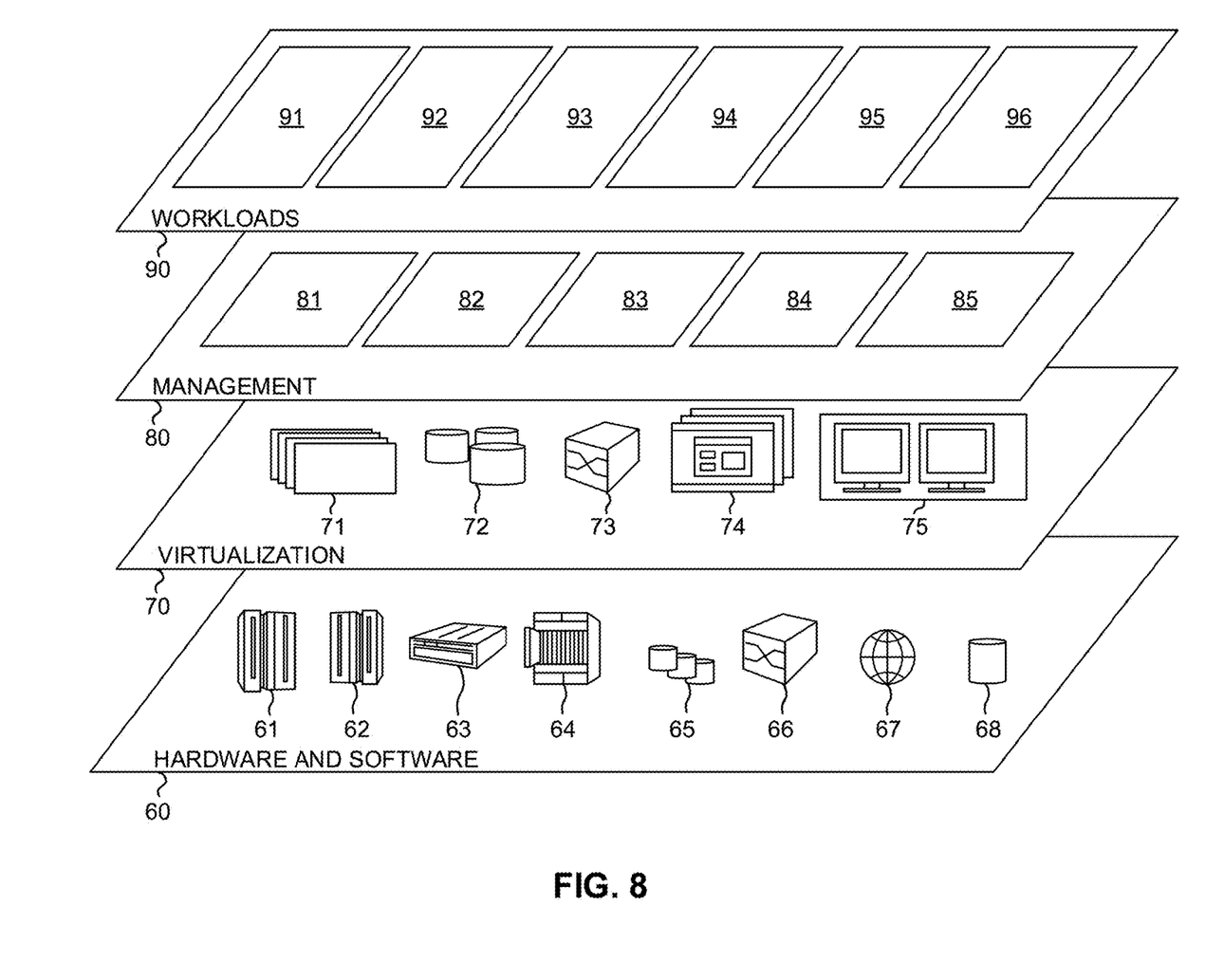
FIG. 8 depicts abstraction model layers according to an embodiment of the present disclosure.

Referring now to FIG. 1, depicted is an example method 100 for automated endpoint detection and response attack process tree analysis, in accordance with embodiments of the present disclosure. Method 100 can include more or fewer operations than those depicted. Method 100 can include operations in different orders than those depicted. In some embodiments, method 100 can be performed by an analyst device (such as analyst device 600 depicted in FIG. 6), including by software or firmware located on the analyst device. In some embodiments, method 100 can be performed by one or more devices operated by a security analyst or other user, including by using devices utilizing cloud computing technology (such as depicted in FIGS. 7 and 8). In the following discussion, method 100 will be described as being performed by an analyst device, but the present disclosure is not limited to such. Many types of computers including desktop, laptop, mainframe, server, smartphone, or any other type of computer could be used in some embodiments.

From start 102, the analyst device receives one or more security alerts at 104. Security alerts can be received using various existing technologies including technologies such as anti-virus software. A security alert can contain an indication regarding the nature of the alert and may come in various forms. Alerts may be received by gathering alerts (or a subset of alerts such as high priority alerts) and may include using a filter. Types of alerts can include, but are not limited to, a file alert, a file-less alert, a process alert, a process impersonation alert, an outbound communication alert, or any other alert indicating the potential presence of malware or attack on a computer. An alert may be of more than one type.

A file alert can indicate that a specified file is involved in a malware attack and may indicate that the file contains malware, contains a link to malware, contains a downloader for malware, or is otherwise associated with a malware attack. A file-less alert can include an indication that a process ran at a particular time or is running and may be associated with a malware attack. A file-less alert can also correspond to a suspicious event. A process alert can include an indication that a particular process was detected and may be associated with a malware attack. A process alert may relate to a source process, a victim process, and/or a suspicious process. A process impersonation alert can include an indication that a process was detected which is impersonating a reputable process, e.g., by using the same name as the reputable process. An outbound communication alert can be an indication that a suspicious outbound communication was sent, such as a connection to a known or suspected attack website or internet protocol (IP) address and may be triggered by an outbound communication that the user of an endpoint did not initiate.

At 106, the analyst device can initiate an auto-play of an attack flow on a process tree. A user of the analyst device, who can be a security analyst or in some embodiments can be the device's primary user (who may not have expertise in malware detection or malware attack resolution) can cause the analyst device to initiate the auto-play. The auto-play analysis can happen in the background and an auto-play indicator can be displayed for alerts at 120, when new information is available. A process tree can be a visual representation of all recorded events and processes that occurred on an endpoint. An endpoint can be an internet-capable computer hardware device and can refer to desktop computers, laptops, smart phones, tablets, thin clients, printers or other specialized hardware. The process tree can include suspicious processes or events as well as innocent processes or events. The process tree can also include links between connected processes or events, which can be represented by, e.g., lines or arrows. A user can click on or otherwise select a process or event and obtain additional details about the selection. These details can vary in embodiments and may include file or process names, dates/times associated with a file or process (such as creation, modification, access, start time, and/or end time), a hash or identifier such as an MD5, a version number or name, a signature, a process ID, an event type, a protocol used (e.g., TCP), a local IP address, a local port, a remote IP address, a remote port, or any other additional details to be presented to a user.

Initiating auto-play at 106 can occur by a user accessing a process tree and selecting an option such as "auto-play attack flow." The nature of how a user selects or clicks on an option to initiate the auto-play of the attack flow can vary in embodiments. In other embodiments, auto-play can be initiated at 106 automatically by a computer when one or more security alerts are received. This automatic initiation can be limited to particular types of alerts, frequency of received alerts, or otherwise limited.

At 108, the analyst device selects an alert for processing. In some embodiments, when a user initiates the auto-play, they can do so by selecting an alert and selecting an option to initiate the auto-play with respect to that selected alert. This may occur if an analyst device receives a security alert which the user notices and/or is concerned about. In such embodiments, the user-selected alert can be the alert selected by the analyst device at 108. In other embodiments, the analyst device can select an alert for processing automatically. In some embodiments, the analyst device can automatically select an alert for processing by selecting each alert received in order. In other embodiments, alerts may have a priority value or label associated with them and the automatic selection of alerts for processing can proceed by selecting the highest priority alert for processing before processing lower priority alerts. In some embodiments, the analyst device can select more than one (or all) alert(s) for processing simultaneously. In some embodiments, more than one alert can be selected when the alerts contain information which indicates they are related (e.g., one alert detects a suspicious file containing an executable and a second alert detects the same executable running as a process). This may occur if the analyst device has linked related alerts at 116 below or has otherwise determined a connection exists between the alerts.

At 110, the analyst device determines one or more types associated with the alert. These types can be the same as those discussed above regarding operation 104. In some embodiments, these types can be previously determined during detection of the alert (e.g., anti-virus or other detection software). In some embodiments, the auto-play on the analyst device can read the alert and any details contained with the alert to determine one or more types associated with the alert. For example, if an alert identifies a suspicious file named VirusContainingDocument.doc, the analyst device can determine that the alert is a file alert.

At 112, the analyst device runs one or more queries based on the type of the alert determined at 110 and the contents of the alert. In some embodiments, these queries can be the same types of queries which a security analyst could manually run when presented with the alert. The precise queries used by the analyst device will vary in embodiments depending on the alert, the alert's contents, and the type of the alert.

For example, if an alert for an endpoint device labeled WESTCOASTSALESM was received and the type of alert was determined to be a process impersonation alert, queries can be run to search for all child processes and all parent processes of any processes and files associated with the alert. The queries can be run on the device (WESTCOAST-SALESM) or on data collected from the device which is stored in a cloud or otherwise located. If the alert contained an MD5 signature for the process (e.g., process_image_md5=3f50b2fc713cb88015cbe372349b14 eb), a query could be run such as "bf_endpoint_name: WESTCOASTSALESM AND (event_create_proc: (process_image_md5=3f50b2fc713cb88015cbe372349b1 4eb) OR event_file_update: (md5=3f50b2fc713cb88015cbe372349b14eb))". This example query (and the example queries which follow) is presented in pseudocode for example purposes only. Any variation of this pseudocode or other code could be used to accomplish the same goal of searching for all child processes and all parent processes of any processes and files associated with the alert. Additionally, while one example query is presented in this example, more than one query can be run using the information contained in the alert.

In some embodiments, the queries run at 112 can be selected by the analyst device from a predetermined list of queries by inserting the relevant data from the alert. Continuing with the above example, the analyst device may contain a list of potential queries including the potential query "bf_endpoint_name:<device>] AND (event_create_proc:(process_image_md5=<md5>) OR event_file_update:(md5=<md5>))" where the analyst device uses data from the alert to fill in the <device> and <md5> information. In other embodiments, the analyst device can generate the queries run at 112 for each alert.

In some embodiments, queries run at 112 can be run in an iterative fashion. For example, a query relating to an alert can identify all child processes relating to the contents of the alert and then a second query can be run to identify all child processes relating to the child processes identified by the first query. This can be performed until there are no further child processes.

For example, the analyst device can run a query to search for all child events associated with a malicious pdf MD5 detected when running queries on an initial process impersonation alert using the example above. Using data from the alert including md5=3f50b2fc713cb88015cbe372349b14eb (the md5 of the file) and bf_endpoint_name: WESTCOAST-SALESM (the name of the device), a query can be run to return event data for events that changed the file the device. This query could look like: "upid-event:upid AND event_ file_update:(md5=3f50b2fc713cb88015cbe372349b14eb) where bf_endpoint_name: WESTCOASTSALESM".

In another example, if an alert for file-less malware has been selected for processing, the analyst device can search for processes that ran at the detection time specified in the alert for fileless malware. Such a query could look like: "upid and process_time=<time of above event plus/minus 1 minute> where bf_endpoint_name:WESTCOAST-SALESM" where the analyst device would use the time of the event to calculate the time window of "time of above event plus/minus 1 minute" in the example query. Another possible query for file-less malware could be a query to search for registry changes at time of the file-less malware detection. This query could take the form of: "event_name=reg_update_value and event: timestamp=<time of above event plus/minus 1 minute> where bf_endpoint_name:WESTCOASTSALESM".

In some instances, the queries performed at 112 may not generate useful information. For example, if the result from the above registry change search was that there was a reg_update_value which created a file with content <XYZ> and changed the file permission to executable, this could be insufficient to further link this alert to another alert due to the lack of a file creation time, MD5 value, or parent process. It is possible that when additional alerts are processed, this alert may later be linked to such an alert when the content <XYZ> is discovered in connection to that alert.

Another example query situation for operation 112 is if an alert has been selected for processing and it relates to process hollowing. Process hollowing can by a type of malware attack where a legitimate process is started in a suspended state, its legitimate code removed (or hollowed out) and malicious code is inserted into the process. A query can be run to search for the process that created the source process for a file named, e.g., process_hollowing.exe. This query can search for attributes of source process for a malicious downloaded file (which may be detected in another alert). The query could be: "(event_create_proc: (process_image_md5=<value of MD5 in generated alert>) OR event_file_update:(md5=<value of MD5))". Additionally, a query can search for file attributes of the target process of process hollowing such as "image_file where upid=<above process id>."

As another example, one or more queries can be run at 112 for an alert regarding suspicious outbound communication. A query can be run to search for file attributes of a parent process of the suspicious outbound connections and/or attributes of parent process file. Additionally, a query can be run to search for file attributes of all child processes. A query can also search for a match where a process or event was linked with the alert for suspicious outbound communication. A query could be: "image_file where upid in:(set where parent_upid=event:upid)". Another query could search for a suspicious file that was the origin of malicious outbound communication.

At 114, the analyst device identifies relevant related files, events, and processes. By running the queries at 112, the auto-play on the analyst device collects information linking the contents of the alert (including relevant files and/or processes identified therein) with other files, events, and processes. Through doing so, the auto-play traverses the process tree, correlating files, events, and processes. Where a new file, event, and/or process is discovered, it can be added to the auto-play and the auto-play can become more comprehensive. The analyst device can use the information gathered from the queries at 112 to create an attack flow which begins at the source of the attack, continues through all files, events, and processes which resulted from the attack, and culminate in the results of an attack, such as outbound communications or events/processes that did not result in further events/processes.

At 116, the analyst device can determine if one or more of the alerts selected for processing at 108 are related to other alerts and link the related alerts. This can occur when two or more alerts contain information regarding identified relevant related files, events, and processes from operation 114. For example, if a first alert resulted from detection of a suspicious file containing an executable, the analyst device ran queries on the file alert, and identified the executable was running as a process and that the process initiated an outbound communication to a remote IP address. If in this example, a second alert resulted from the detection of the same executable running as a process and a third alert resulted from detection of the outbound communication to a remote IP address, the analyst device can link the first, second, and third alerts. This linkage can be displayed to a user during operation 120 and/or used when processing additional alerts.

For another example, in the above registry query example, the query result indicated there was a reg_update_value which created a file with content <XYZ>. If another alert lead to a suspicious file with contents of <XYZ>, these two alerts could be linked by the analyst device at 116 and added to the auto-play. In some embodiments, at 120 below, a user can select to confirm or reject the analysis linking alerts is correct and to collate the alerts so the number of separate alerts is reduced.

At 118, the analyst device checks whether another alert exists for processing. This can involve checking whether any linked related alerts from 116 have not yet been processed. This can also involve processing alerts which have not yet been processed to determine if they are related. If additional alerts exist, method 100 returns to operation 108 to select an alert for processing and proceed through operations 110 through 116.

When the analyst device determines there are no additional alerts to process at 118, method 100 proceeds to 120. At 120, the analyst device displays the full flow of the attack. This can vary in embodiments. In some embodiments, the full flow of the attack can be presented as a process tree with processes related to the attack highlighted. This can include the relevant related files, events, and processes determined at 114 for each alert which was linked together in 116. This can include highlighting files, events, and processes related to the alerts, and can include highlighting additional details associated with the files, events, and processes which connect them (e.g., matching MD5 numbers, process names, etc.).

At 122, the analyst device provides an initial response. In some embodiments, this can be an automatic action taken by the analyst device, such as automatic quarantine of the compromised endpoint. In some embodiments, this can be presenting the user of the device or a security analyst with a recommended response. This can also include a likely impact of the recommended response and/or supporting the analyst in performing the action. For example, if the recommended response is quarantine of the affected endpoint, the recommendation can include a prompt where a user can select to execute the response and the analyst device can execute the quarantine procedure in response to a user input to the prompt. Many other possible actions and recommended responses can exist and can include quarantining one or more files on a device, which may be the recommended action if quarantine of a device running critical infrastructure is not possible or would be excessively disruptive. In some embodiments, a user or security analyst can reject a recommended response and/or take a different action to address the malware attack. An initial response can additionally include searching a network to find other endpoint devices with identified files, alerts, and processes which match that found on the endpoint device through performance of method 100. A further example of an initial response is to run queries across all devices in an enterprise, based on the auto-play, to detect if any other devices are infected or in the process of being infected by the attack. For instance, some devices may be in the earliest phase of attack, where the attack has is lying dormant and no alert has already been generated. In this example, the results of these additional queries can be added to the auto-play, so it can be possible for an analyst to view all devices infected and to what extent. After 122, method 100 ends at 124.

Figure 2:
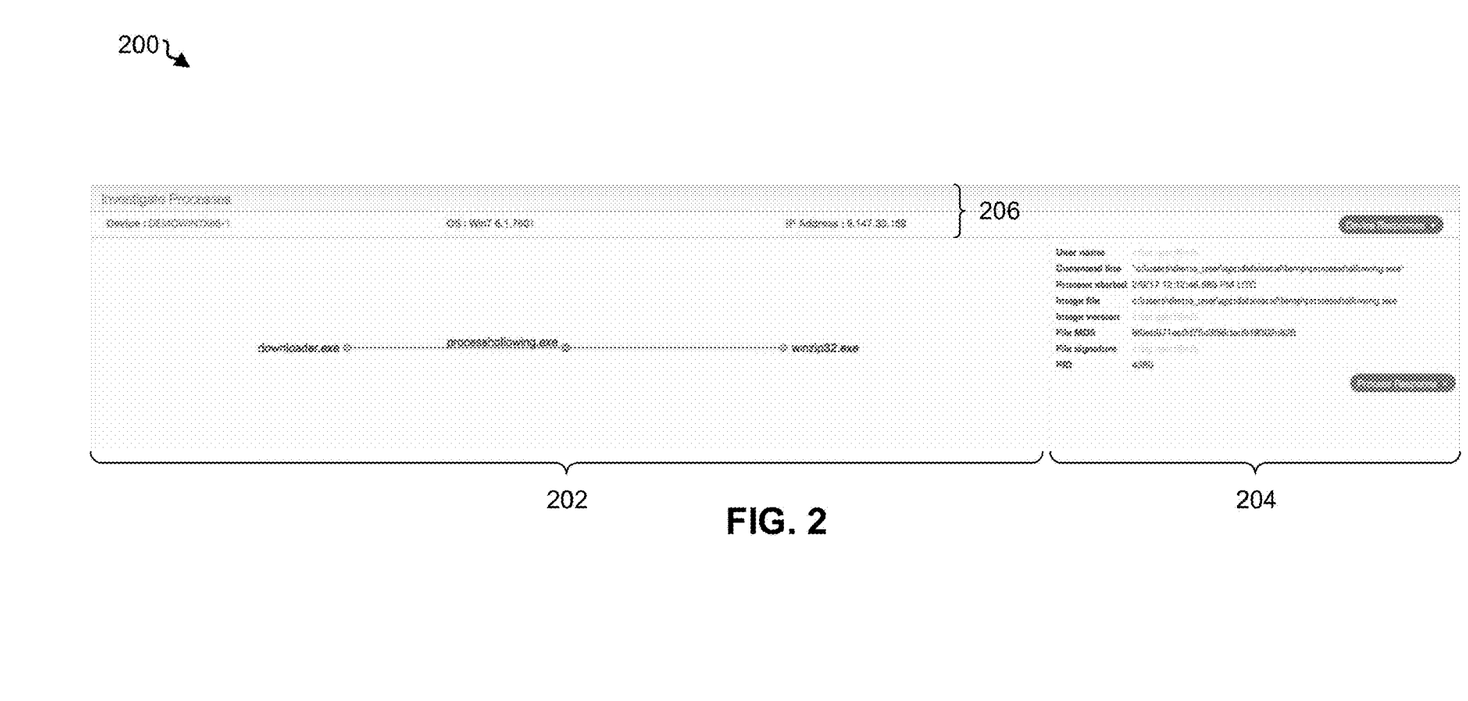
FIG. 2 depicts an example user interface including a process tree and detail selected for a suspicious process, in accordance with embodiments of the present disclosure.

Referring now to FIG. 2, depicted is an example user interface 200 including a process tree and detail selected for a suspicious process, in accordance with embodiments of the present disclosure. FIG. 2 is an example of a user interface that can be used to provide information to a user, including a security analyst, in conjunction with performing method 100 and/or in displaying full flow according to operation 120 of FIG. 1, described in more detail above. For example, a user may view user interface 200 during the performance of method 100 of FIG. 1 upon receipt of a security alert (such as at operation 104 of method 100) and/or when initiating auto-play (such as at operation 106 of method 100). While FIG. 2 depicts an example user interface 200 as arranged, various other arrangements and modifications of user interface 200 (including rearranging portions of user interface 200 or splitting user interface 200 into multiple windows or displays) may exist and are contemplated by this disclosure.

FIG. 2 includes a process tree region 202, a detail region 204, and a header 206. Process tree region 202 is an area of the user interface 200 where an auto-play application (such as auto-play application 632 of FIG. 6) can display a process tree. The process tree shown in process tree region 202 includes three processes: downloader.exe, processhollowing.exe, and winzip32.exe. A process tree can have more or fewer processes than this example. A user can click on a suspicious process, such as processhollowing.exe in the example of FIG. 2. Detail region 204 is an area where the user interface 200 displays additional details regarding a process. In FIG. 2, the example process processhollowing.exe has details shown for a command line, a time the process was started, an image file, a file MD5, and a PID (process identifier). Header 206 displays information regarding the endpoint device for which the user interface 200 corresponds. In FIG. 2, header 206 includes information on the device name, operating system, and IP address, but different information can be displayed in header 206 in different embodiments.

Figure 3:
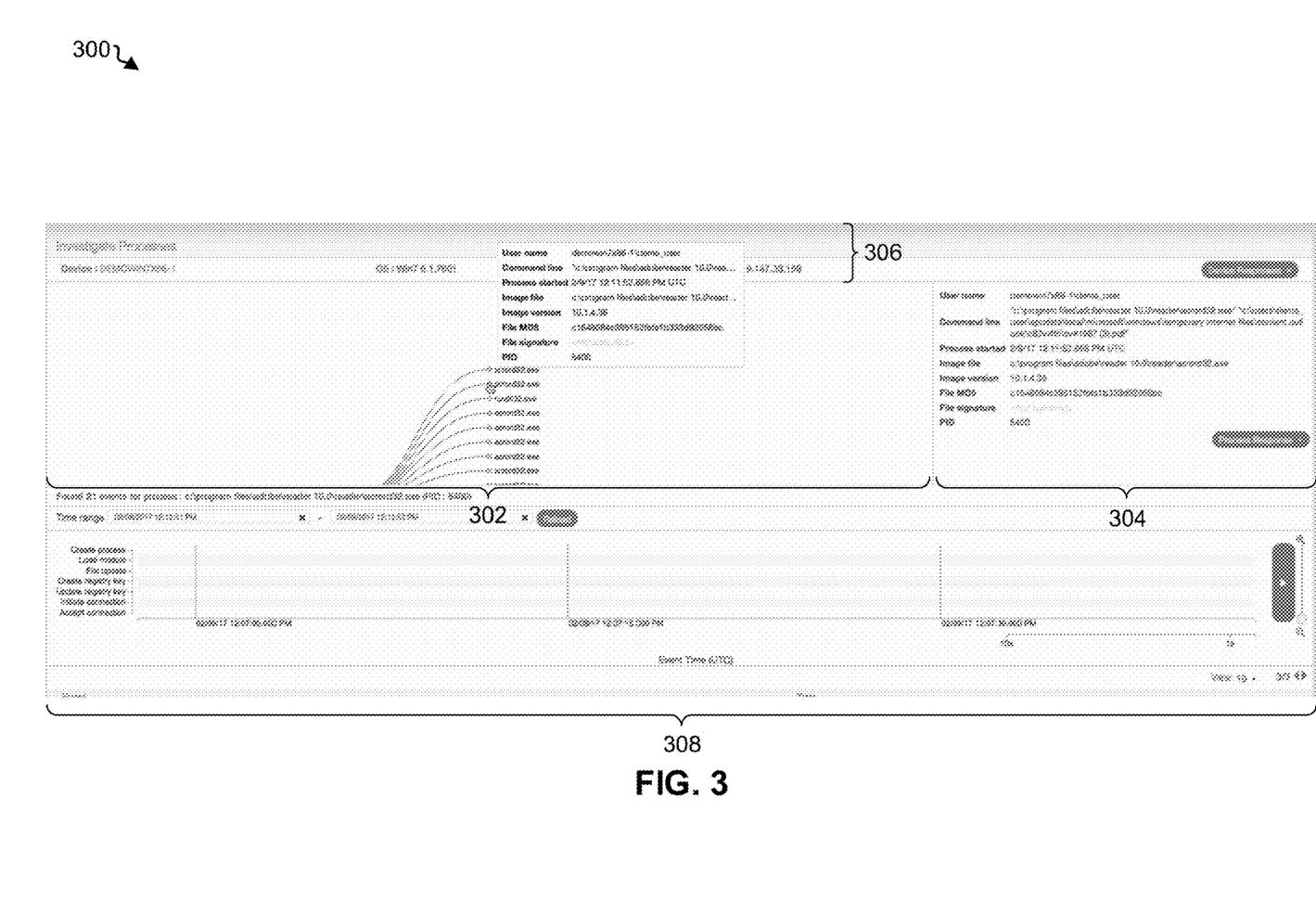
FIG. 3 depicts an example user interface including a process tree, detail selected for a suspicious process, and timeline, in accordance with embodiments of the present disclosure.

Referring now to FIG. 3, depicted is an example user interface 300 including a process tree, detail selected for a suspicious process, and timeline, in accordance with embodiments of the present disclosure. FIG. 3 is an example of a user interface that a user, including a security analyst, can use in conjunction with the performance of method 100 by a computer and/or in viewing a displayed full flow according to operation 120 of FIG. 1, described in more detail above. For example, a user may view user interface 300 during the performance of method 100 of FIG. 1 when initiating auto-play (such as at operation 106 of method 100) and/or when an alert is selected for processing (such as at operation 108 of method 100). The user interface 300 can be displayed when a user clicks an option such as "auto-play attack flow." While FIG. 3 depicts an example user interface 300 as arranged, various other arrangements and modifications of user interface 300 (including rearranging portions of user interface 300 or splitting user interface 300 into multiple windows or displays) may exist and are contemplated by this disclosure.

FIG. 3 includes a process tree region 302, a detail region 304, a header 306, and a timeline 308. Process tree region 302 can be substantially the same as process tree region 202 of FIG. 2 and is an area of the user interface 300 where an auto-play application (such as auto-play application 632 of FIG. 6) can display a process tree. The example process tree shown in process tree region 302 includes eight processes: seven acrord32.exe processes and one rundll32.exe process. A process tree can have more or fewer processes than this example. A user can click on a suspicious process, such as one of the acrord32.exe processes in the example of FIG. 3. Detail region 304 is an area where the user interface 300 displays additional details regarding a process and can be substantially the same as detail region 204 of FIG. 2. In FIG. 3, the content displayed in detail region 304 is also displayed as a popup where the mouse cursor is hovered over the selected acrord32.exe process.

Header 306 displays information regarding the endpoint device for which the user interface 300 corresponds. Header 306 can be substantially the same as header 206 of FIG. 2. FIG. 3 includes timeline 308, where events can be added to a timeline as method 100 is performed and events are identified, and as related alerts are linked.

In the example of FIG. 3, the user interface displays the source of the attack, which was a malicious PDF document, and which was run from Adobe® Reader® v10. This functionality is beneficial because an analyst might miss that the PDF document was malicious since many acrord32.exe processes are being run and the others may not be malicious. The MD5 of the malicious PDF as shown in detail region 304 can be highlighted. The auto-play can then automatically traverse the process tree, including for example through to a point of the suspicious outbound communication, and highlighting key events and processes along the way.

Figure 4:
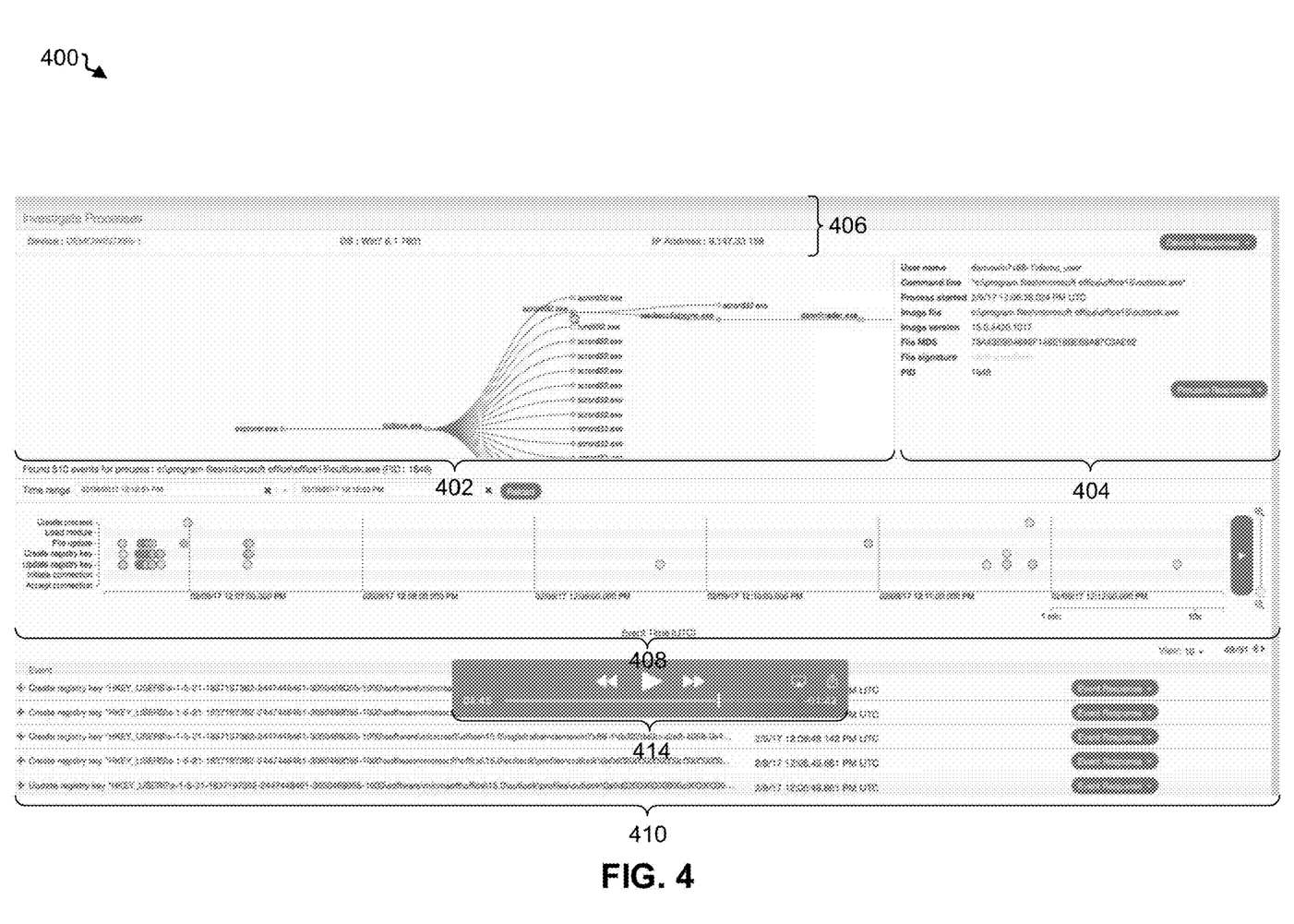
FIG. 4 depicts an example user interface including a portion of a full flow including a process tree, detail selected for a suspicious process, and timeline, in accordance with embodiments of the present disclosure.

Referring now to FIG. 4, depicted is an example user interface 400 including a portion of a full flow including a process tree, detail selected for a suspicious process, and timeline, in accordance with embodiments of the present disclosure. FIG. 4 is an example of a user interface that a user, including a security analyst, can use in viewing a displayed full flow according to operation 120 of FIG. 1, described in more detail above. The user interface 400 can be displayed when method 100 has been completed. While FIG. 4 depicts an example user interface 400 as arranged, various other arrangements and modifications of user interface 400 (including rearranging portions of user interface 400 or splitting user interface 400 into multiple windows or displays) may exist and are contemplated by this disclosure.

FIG. 4 includes a process tree region 402, a detail region 404, a header 406, a timeline 408, an event region 410, and play controls 414. Process tree region 402 can be substantially the same as process tree regions 202 of FIG. 2 and 302 of FIG. 3 and is an area of the user interface 400 where an auto-play application (such as auto-play application 632 of FIG. 6) can display a process tree. The process tree shown in process tree region 402 includes a plurality of processes including at least explorer.exe, outlook.exe, eleven acrord32.exe processes, rundll32.exe, adobecollabsync.exe, and downloader.exe. A process tree can have more or fewer processes than this example. A user can click on a process, such as the outlook.exe process in the example of FIG. 4.

Detail region 404 is an area where the user interface 400 displays additional details regarding a process and can be substantially the same as detail region 204 of FIG. 2 and detail region 304 of FIG. 3.

Header 406 displays information regarding the endpoint device for which the user interface 400 corresponds. Header 406 can be substantially the same as header 206 of FIG. 2 and header 306 of FIG. 3. FIG. 4 includes timeline 408, where a plurality of events are displayed on a timeline resulting from the performance of method 100 and events were identified and related alerts linked. The timeline 408 of FIG. 4 includes events from approximately Feb. 9, 2017 12:06:30 p.m. until approximately Feb. 9, 2017 12:12:52 p.m. FIG. 4 includes event region 410 where information for selected events from the timeline 408 can be displayed. This information includes a description of the event, the time of the event, and a button for an event response. Play Controls 414 can enable a user to initiate an auto-play and/or review an auto-play and may include controls such as play, pause, rewind, fast forward, or other controls.

In the example of FIG. 4, the user interface displays the result of performing method 100, which is a full flow of the malware attack. The auto-play has automatically traversed the process tree, through to a point of the suspicious outbound communication, and highlighted key events and process along the way. The portion of a full flow created by the auto-play and depicted in FIG. 4 shows that from outlook.exe, an Adobe Reader process was run, and this loaded a malicious PDF. The full flow created by the auto-play also shows a malicious child process downloader.exe.

Figure 5:
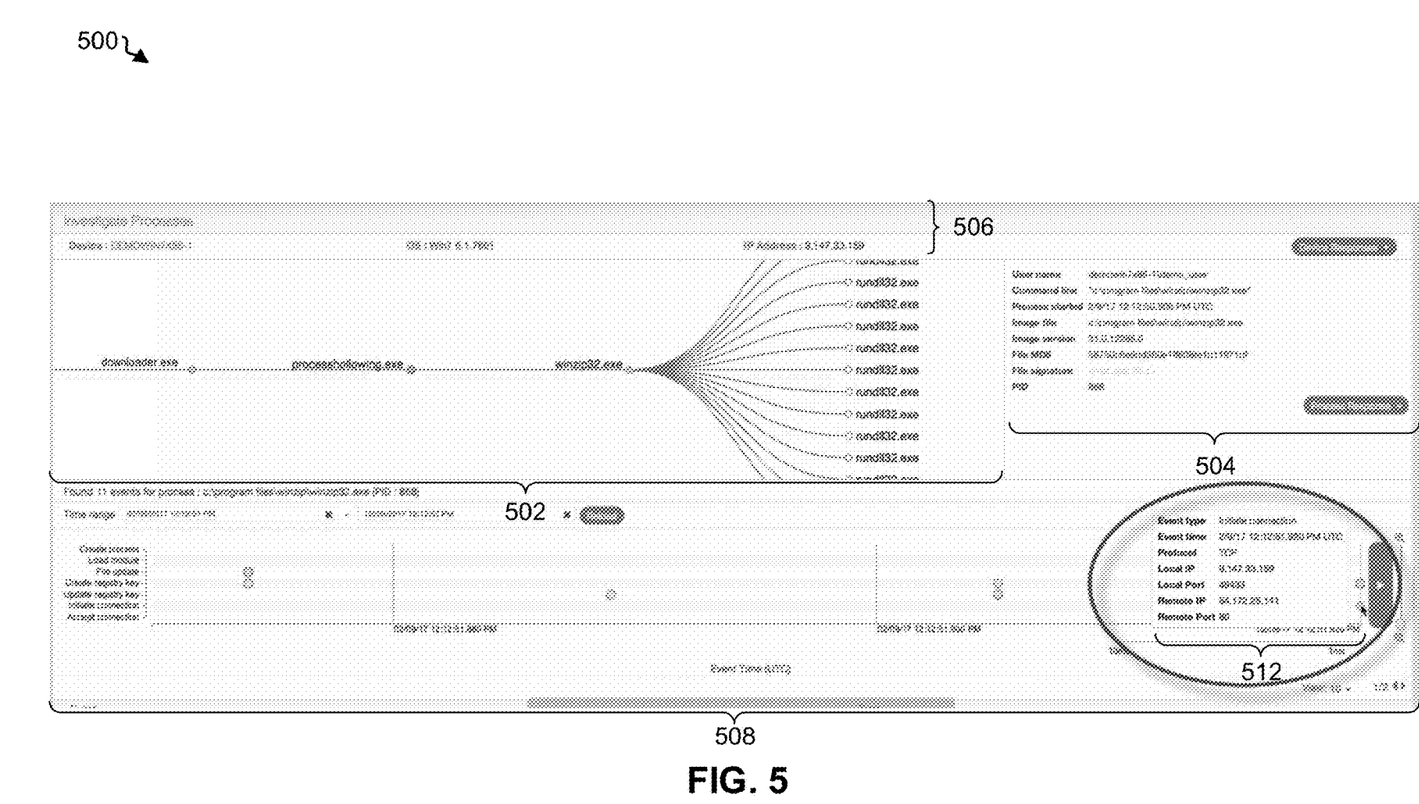
FIG. 5 depicts an example user interface including a portion of a full flow including a process tree, detail selected for a suspicious process, and timeline, in accordance with embodiments of the present disclosure.

Referring now to FIG. 5, depicted is an example user interface 500 including a portion of a full flow including a process tree, detail selected for a suspicious process, and timeline, in accordance with embodiments of the present disclosure. FIG. 5 is an example of a user interface that a user, including a security analyst, can use in viewing a displayed full flow according to operation 120 of FIG. 1, described in more detail above. The user interface 500 can be displayed when method 100 has been completed. User interface 500 and user interface 400 can be two representations of one user interface with different portions of the full flow shown in each user interface. While FIG. 5 depicts an example user interface 500 as arranged, various other arrangements and modifications of user interface 500 (including rearranging portions of user interface 500 or splitting user interface 500 into multiple windows or displays) may exist and are contemplated by this disclosure.

FIG. 5 includes a process tree region 502, a detail region 504, a header 506, a timeline 508, and an event detail 512. Process tree region 502 can be substantially the same as process tree regions 202 of FIG. 2, 302 of FIG. 3, and 402 of FIG. 4 and is an area of the user interface 500 where an auto-play application (such as auto-play application 632 of FIG. 6) can display a process tree. The process tree shown in process tree region 502 includes a plurality of processes including at least processhollowing.exe, winzip32.exe, and ten rundll32.exe processes. Process tree region 502 also shows a process named downloader.exe which also appears in FIG. 4 connects the process tree regions 402 and 502. A process tree can have more or fewer processes than this example. A user can click on a process, such as the winzip32.exe process in the example of FIG. 5. Detail region 504 is an area where the user interface 500 displays additional details regarding a process and can be substantially the same as detail region 204 of FIG. 2, detail region 304 of FIG. 3, and detail region 404 of FIG. 4.

Header 506 displays information regarding the endpoint device for which the user interface 500 corresponds. Header 506 can be substantially the same as header 206 of FIG. 2, header 306 of FIG. 3, and header 406 of FIG. 4. FIG. 5 includes timeline 508, where a plurality of events are displayed on a timeline resulting from the performance of method 100 and events were identified and related alerts linked. The timeline 508 of FIG. 5 includes events from approximately Feb. 9, 2017 12:12:51.860 until approximately Feb. 9, 2017 12:12:51.920, which represents approximately the last second of the timeline 408 of FIG. 4. FIG. 5 includes event detail 512 where a popup is shown. The popup can result, for example, from a user selecting or hovering over the event with the mouse arrow icon or by touching the event with a touch screen. Event detail 512 provides detail about the corresponding event including the event type, event time, protocol, local IP address, local port, remote IP address, and remote port.

In the example of FIG. 5, the user interface displays the result of performing method 100, which is a full flow of the malware attack. The auto-play has automatically traversed the process tree, through to a point of the suspicious outbound communication, and highlighted key events and process along the way. The portion of a full flow created by the auto-play and depicted in FIG. 5 continues from that shown in FIG. 4 with malicious child process downloader.exe. This process connects to an unknown IP address and downloads a file. It then shows that a processhollowing.exe process was initiated and that this process spawns another process, winzip32.exe. The auto-play will highlight that this winzip32 process is being impersonated by processhollowing.exe and can show that an alert was generated when the process impersonation was detected. In FIG. 5, the process tree has now been traversed through to the point of the security breach, where the suspicious outbound communication has occurred, as shown in event detail 512. Between FIGS. 4 and 5, the full flow of the attack shows from where Adobe Reader opened a PDF to the point where the external communication to an unknown IP address was established.

Figure 6:
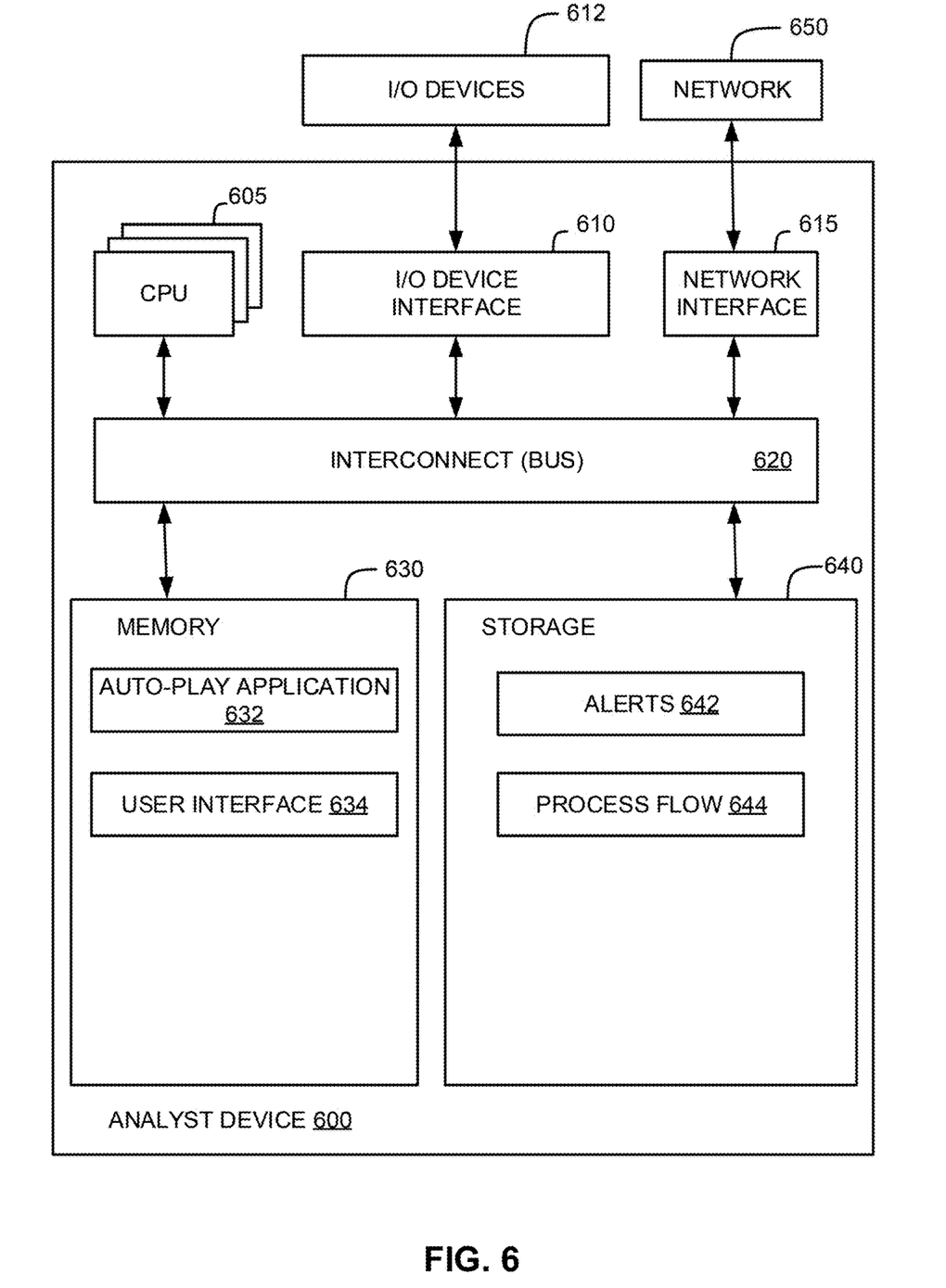
FIG. 6 illustrates a block diagram of an analyst device, in accordance with some embodiments of the present disclosure.

Referring now to FIG. 6, illustrated is a block diagram of an analyst device 600, in accordance with some embodiments of the present disclosure. In some embodiments, analyst device 600 performs operations in accordance with FIG. 1 and/or displays one or more user interfaces in accordance with FIGS. 2 through 5 as described above. The analyst device 600 can include one or more processors 605 (also referred to herein as CPUs 605), an I/O device interface 610 which can be coupled to one or more I/O devices 612, a network interface 615, an interconnect (e.g., BUS) 620, a memory 630, and a storage 640 (which can correspond to storage 104 of FIG. 1).

In some embodiments, each CPU 605 can retrieve and execute programming instructions stored in the memory 630 or storage 640. The interconnect 620 can be used to move data, such as programming instructions, between the CPUs 605, I/O device interface 610, network interface 615, memory 630, and storage 640. The interconnect 620 can be implemented using one or more busses. Memory 630 is generally included to be representative of a random access memory (e.g., static random access memory (SRAM), dynamic random access memory (DRAM), or Flash).

In some embodiments, the memory 630 can be in the form of modules (e.g., dual in-line memory modules). The storage 640 is generally included to be representative of a non-volatile memory, such as a hard disk drive, solid state device (SSD), removable memory cards, optical storage, or flash memory devices. In an alternative embodiment, the storage 640 can be replaced by storage area-network (SAN) devices, the cloud, or other devices connected to the analyst device 600 via the I/O devices 612 or a network 650 via the network interface 615.

The CPUs 605 can be a single CPU, multiple CPUs, a single CPU having multiple processing cores, or multiple CPUs with one or more of them having multiple processing cores in various embodiments. In some embodiments, a processor 605 can be a digital signal processor (DSP). The CPUs 605 can additionally include one or more memory buffers or caches (not depicted) that provide temporary storage of instructions and data for the CPUs 605. The CPUs 605 can be comprised of one or more circuits configured to perform one or more methods consistent with embodiments of the present disclosure.

The memory 630 of analyst device 600 includes auto-play application 632 and user interface 634. Auto-play application 632 is an application for automated endpoint detection and response attack process tree analysis. Auto-play application 632 can perform all or part of method 100 of FIG. 1.

User interface 634 can be part of auto-play application 632 or can exist as a separate application. User interface 634 can display information regarding alerts, processes, and results of performance of method 100 of FIG. 1. Examples of screenshots of user interface 634 are provided in FIGS. 2 through 5.

Storage 640 contains alerts 642 and process flow 644. Alerts 642 can be data received from a malware detection program which contain data regarding suspicious files, processes, and/or events. Alerts 642 can be used in the performance of method 100 of FIG. 1.

Process flow 644 can be a representation of processes involved in a malware attack. Examples of process flows are provided as process flow 202 of FIG. 2, process flow 302 of FIG. 3, process flow 402 of FIG. 4, and process flow 502 of FIG. 5.

In some embodiments as discussed above, the memory 630 stores auto-play application 632 and user interface 634, and the storage 640 stores alerts 642 and process flow 644. However, in various embodiments, each of the auto-play application 632, user interface 634, alerts 642, and process flow 644 are stored partially in memory 630 and partially in storage 640, or they are stored entirely in memory 630 or entirely in storage 640, or they are accessed over a network 650 via the network interface 615.

In various embodiments, the I/O devices 612 can include an interface capable of presenting information and receiving input. For example, I/O devices 612 can receive input from a user and present information to a user and/or a device interacting with analyst device 600.

The network 650 can connect (via a physical or wireless connection) the analyst device 600 with other networks, and/or one or more devices that interact with the user device.

Logic modules throughout the analyst device 600—including but not limited to the memory 630, the CPUs 605, and the I/O device interface 610—can communicate failures and changes to one or more components to a hypervisor or operating system (not depicted). The hypervisor or the operating system can allocate the various resources available in the analyst device 600 and track the location of data in memory 630 and of processes assigned to various CPUs 605. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated endpoint detection and response attack process tree analysis 96. Automated endpoint detection and response attack process tree analysis 96 can be a workload or function such as that described in FIG. 1 above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for automated endpoint detection and response, the method comprising:
   receiving security alerts; executing one or more queries automatically, on at least one security alert of the security alerts;
   identifying related processes based on contents of the one of the security alerts, wherein the related processes are related to information contained within the at least one security alert subset of the security alerts;
   running queries in the one or more queries in an iterative manner, to identify all child processes and all parent processes for each process in the related processes;
   determining whether the at least one security alert of the security alerts correlates to other security alerts in the security alerts based on the related processes and child processes and parent processes for each process in the related process;
   receiving an additional security alert in response to determining that the at least one security alert of the security alerts does not correlate to other security alerts in the security alerts;
   linking the additional security alert with the at least one security alert of the security alerts based on the identified related processes and contents for the additional security alert and the at least one security alert of the security alerts; and
   displaying a full flow of a malware attack in form of a process tree, wherein the full flow of a malware attack comprising the additional security alert and the at least one security alert of the security alerts, and the information contained within the at least one security alert of the security alerts and the related processes, and wherein the process tree presents all child processes and all parent processes for each process in the related processes.

2. The method of claim 1, further comprising:
   determining a type of alert for each of the security alerts of the at least one security alert of the one or more security alerts.

3. The method of claim 2, wherein the executing one or more queries automatically is further based on the type of alert for each of the security alerts of the at least one security alert of the one or more security alerts.

4. The method of claim 1, wherein the one or more security alerts and the additional security alert are assigned with priority values, wherein queries for security alerts with higher priority values are executed before queries for security alerts with lower priority values.

5. The method of claim 1, further comprising:
   providing an initial response to the malware attack.

6. The method of claim 5, wherein the initial response to the malware attack is an action taken automatically to quarantine one or more files.

7. The method of claim 5, wherein the initial response to the malware attack is a suggested course of action presented to a user.

8. A system for automated endpoint detection and response, the system comprising: one or more processors; and a memory communicatively coupled to the one or more processors, wherein the memory comprises instructions which, when executed by the one or more processors, cause the one or more processors to perform a method comprising:
   receiving security alerts; executing one or more queries automatically, on at least one security alert of the security alerts;
   identifying related processes based on contents of the one of the security alerts, wherein the related processes are related to information contained within the at least one security alert subset of the security alerts;
   running queries in the one or more queries in an iterative manner, to identify all child processes and all parent processes for each process in the related processes;
   determining whether the at least one security alert of the security alerts correlates to other security alerts in the security alerts based on the related processes and child processes and parent processes for each process in the related process;
   receiving an additional security alert in response to determining that the at least one security alert of the security alerts does not correlate to other security alerts in the security alerts;
   linking the additional security alert with the at least one security alert of the security alerts based on the identified related processes and contents for the additional security alert and the at least one security alert of the security alerts; and
   displaying a full flow of a malware attack in form of a process tree, wherein the full flow of a malware attack comprising the additional security alert and the at least one security alert of the security alerts, and the information contained within the at least one security alert of the security alerts and the related processes, and wherein the process tree presents all child processes and all parent processes for each process in the related processes.

9. The system of claim 8, further comprising:
determining a type of alert for each of the security alerts of the at least one security alert of the one or more security alerts.

10. The system of claim 9, wherein the executing one or more queries automatically is further based on the type of alert for each of the security alerts of the at least one security alert of the one or more security alerts.

11. The system of claim 8, wherein the one or more security alerts and the additional security alert are assigned with priority values, wherein queries for security alerts with higher priority values are executed before queries for security alerts with lower priority values.

12. The system of claim 8, further comprising:
providing an initial response to the malware attack.

13. The system of claim 12, wherein the initial response to the malware attack is an action taken automatically to quarantine one or more files.

14. The system of claim 12, wherein the initial response to the malware attack is a suggested course of action presented to a user.

15. A computer program product for automated endpoint detection and response, the computer program product comprising a computer readable storage medium having program instructions embodied therewith, wherein the computer readable storage medium is not a transitory signal per se, the program instructions executable by a computer to perform a method comprising:
receiving security alerts; executing one or more queries automatically, on at least one security alert of the security alerts;
identifying related processes based on contents of the one of the security alerts, wherein the related processes are related to information contained within the at least one security alert subset of the security alerts;
running queries in the one or more queries in an iterative manner, to identify all child processes and all parent processes for each process in the related processes;
determining whether the at least one security alert of the security alerts correlates to other security alerts in the security alerts based on the related processes and child processes and parent processes for each process in the related process;
receiving an additional security alert in response to determining that the at least one security alert of the security alerts does not correlate to other security alerts in the security alerts;
linking the additional security alert with the at least one security alert of the security alerts based on the identified related processes and contents for the additional security alert and the at least one security alert of the security alerts; and
displaying a full flow of a malware attack in form of a process tree, wherein the full flow of a malware attack comprising the additional security alert and the at least one security alert of the security alerts, and the information contained within the at least one security alert of the security alerts and the related processes, and wherein the process tree presents all child processes and all parent processes for each process in the related processes.

16. The computer program product of claim 15, further comprising:
determining a type of alert for each of the security alerts of the at least one security alert of the one or more security alerts.

17. The computer program product of claim 16, wherein the executing one or more queries automatically is further based on the type of alert for each of the security alerts of the at least one security alert of the one or more security alerts.

18. The computer program product of claim 15, wherein the one or more security alerts and the additional security alerts are assigned with priority values, wherein queries for security alerts with higher priority values are executed before queries for security alerts with lower priority values.

19. The computer program product of claim 15, further comprising:
providing an initial response to the malware attack, wherein the initial response to the malware attack is an action taken automatically to quarantine one or more files.

20. The computer program product of claim 15, further comprising:
providing an initial response to the malware attack, wherein the initial response to the malware attack is a suggested course of action presented to a user.

* * * * *